Feb. 28, 1967  W. J. KUDLATY  3,306,451
FILTER ASSEMBLY HAVING CHECK VALVE AND BYPASS CONDUIT
Filed Oct. 21, 1965  2 Sheets-Sheet 1

INVENTOR.
Walter J. Kudlaty,
BY
Parker & Carter
ATTORNEYS.

United States Patent Office 3,306,451
Patented Feb. 28, 1967

3,306,451
FILTER ASSEMBLY HAVING CHECK VALVE AND BYPASS CONDUIT
Walter J. Kudlaty, Elmhurst, Ill., assignor to Marvel Engineering Company, Chicago, Ill., a corporation of Delaware
Filed Oct. 21, 1965, Ser. No. 499,859
4 Claims. (Cl. 210—135)

This invention is concerned with a hydraulic fluid filter system and more particularly with a filter housing and filter by-pass assembly for such a system.

An object of this invention is a filter by-pass assembly which is useable with a standard filter housing.

Another object is a filter by-pass assembly that can be easily and quickly operated between filtering and by-pass positions.

Another object is a by-pass construction that requires the manipulation of only a single valve for its operation.

Another object is a filter and by-pass assembly that is compact in construction.

Another object is a filter assembly useable with or without a manual by-pass element.

Another object is a by-pass assembly having a check valve that can be easily replaced.

Another object is a by-pass assembly having a check valve that is positively biased to a closed position.

Other objects will be found in the following specification, claims and drawings in which:

FIGURE 3 is an enlarged elevation view of the by-pass valve spool; and

FIGURE 4 is an enlarged partial cross-sectional view of the by-pass valve showing it in a by-pass condition.

Figure 1:
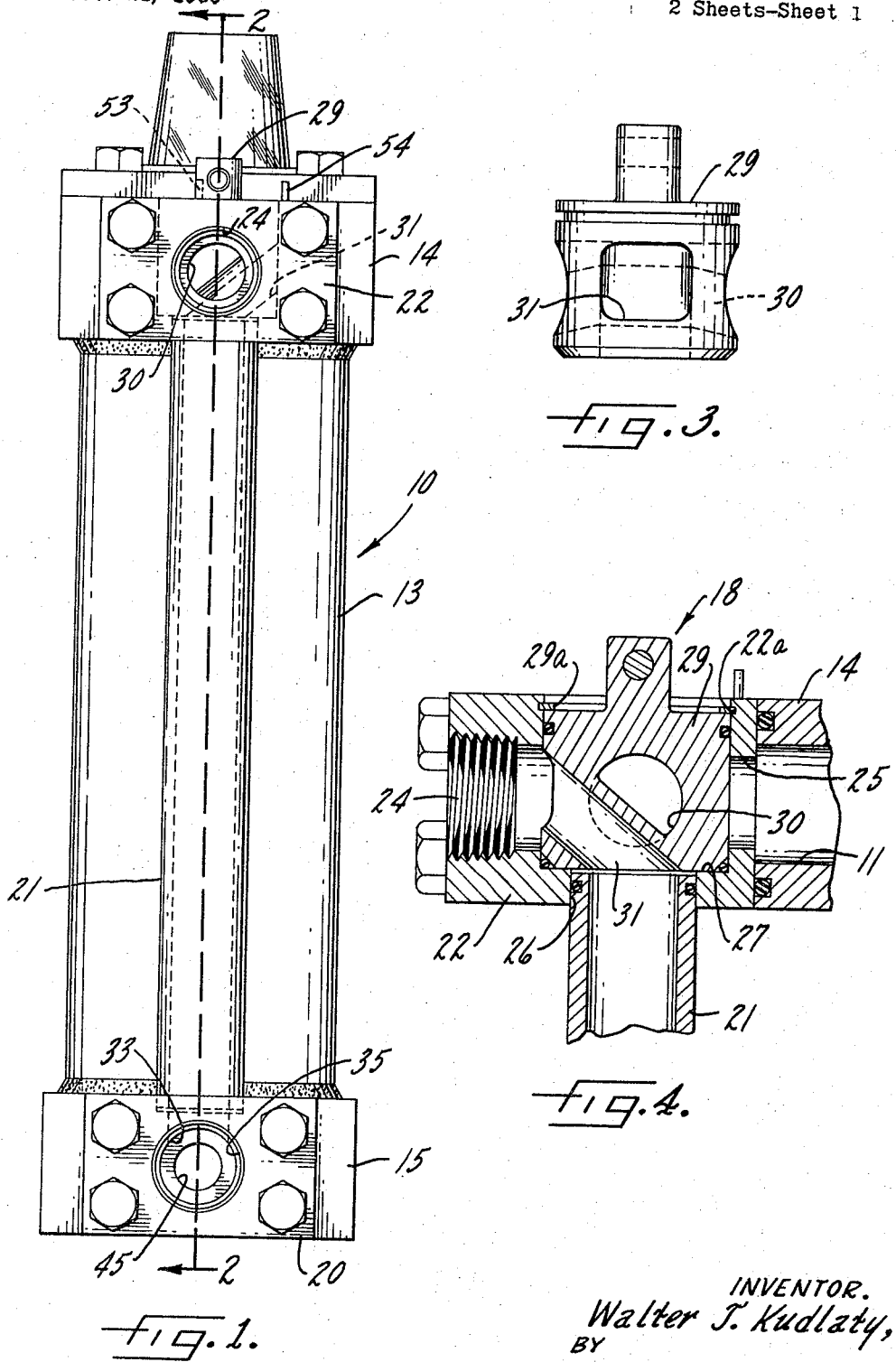
FIGURE 1 is an elevational view showing the by-pass assembly and filter housing.
Figure 2:
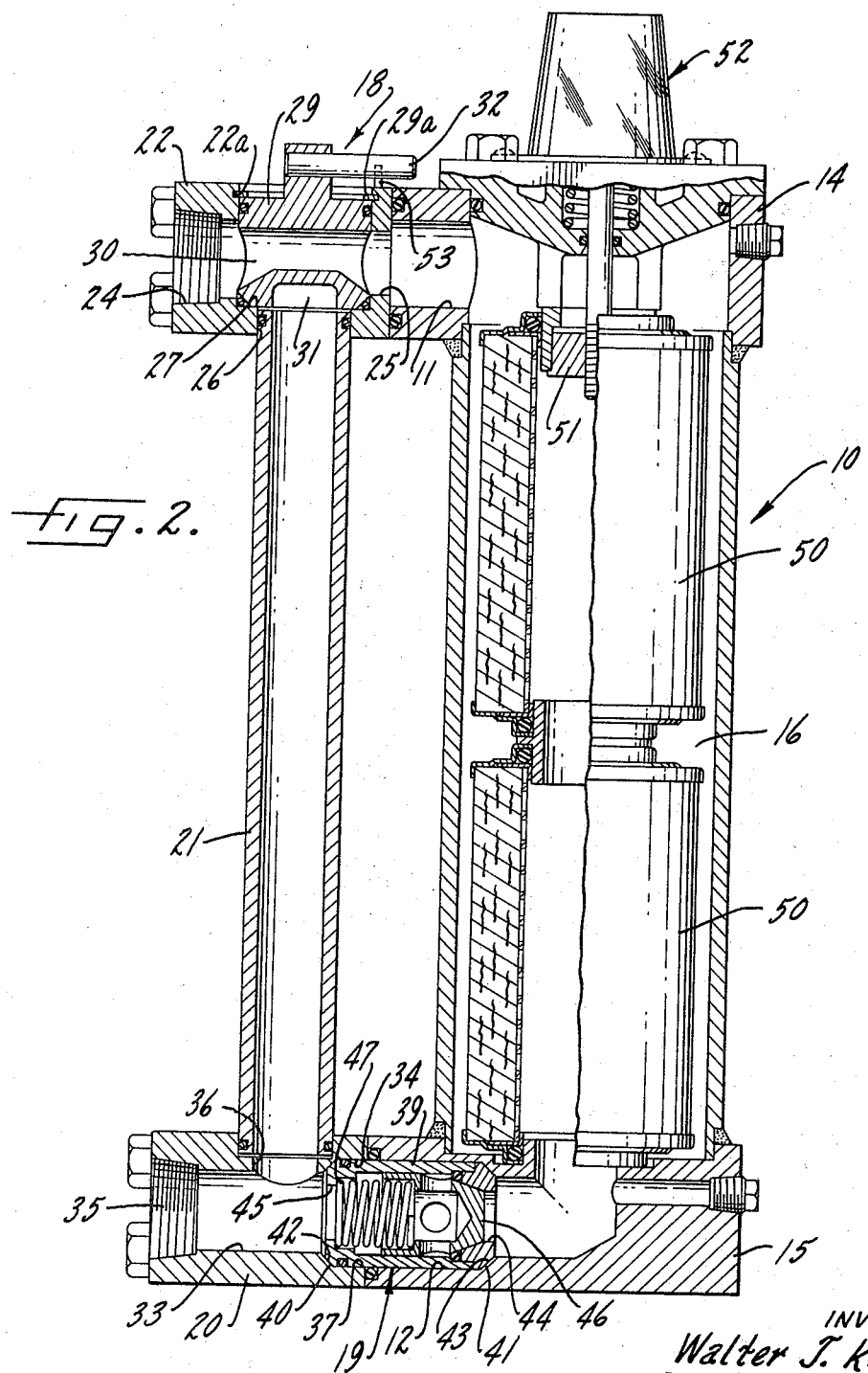
FIGURE 2 is a cross-sectional view taken along line 2—2 of FIGURE 1.

Referring now to the drawings and particularly to FIGURES 1 and 2, the numeral 10 indicates a tubular filter housing having an inlet 11 passage and an outlet passage 12. The filter housing is formed from a tube 13 which is welded to a head or inlet fitting 14 and a base or outlet fitting 15 with the inlet passage being located in the head and the outlet passage in the base. The tube 13 and fittings 14 and 15 define a chamber 16. A by-pass assembly for the filter housing is made up of a valve 18, a check valve cartridge 19, a by-pass discharge fitting 20 and by-pass conduit 21. The valve 18 includes a fitting 22 which is connected to the filter inlet fitting 14 of the filter housing.

The valve fitting 22 is formed with an inlet passage 24, an outlet passage 25 and a by-pass outlet passage 26 and is positioned so that its outlet passage communicates with the inlet passage 11 of the filter housing. The inlet, outlet and by-pass outlet passages communicate with a chamber 27 also formed in the fitting. Positioned in the valve chamber is a valve spool or plug 29 having a lateral passage 30 and an inclined passage 31 extending therethrough with the passages arranged so as not to communicate with each other. The valve plug is held in the valve chamber by a split ring 29a which seats in a groove 22a in the valve fitting.

The valve 18 is equipped with a handle 32 for turning the valve spool 29 from a first position in which the lateral passage 30 connects the valve fitting inlet passage 24 with the valve fitting by-pass outlet passage 26. The first position of the valve spool 29 is shown in FIGURE 2 and the second position is shown in FIGURE 4.

The by-discharge fitting 20 is formed with a central passage 33 having an inlet 34 and outlet 35 and a by-pass inlet 36 with the by-pass inlet positioned between the inlet and outlet. The central passage 33 communicates with the outlet passage 12 of the filter housing when the by-pass discharge fitting is connected to the filter housing outlet 15. The central passage of this fitting is enlarged at 37 to the same diameter as that of the outlet passage 12 in order to receive a portion of the check valve cartridge 19 which extends outwardly of the passage 12 when positioned therein. When the fitting 20 is positioned abutting the fitting 15, the check valve cartridge is completely enclosed in these passages.

The check valve cartridge 19 includes an elongated tube 39 having chamfered surfaces 40 and 41 at its opposite ends, which surfaces contact beveled surfaces 42 and 43 formed, respectively, in the by-pass discharge fitting 20 and the filter housing outlet fitting 15 to locate and position the cartridge. The check valve cartridge is also provided with an inlet 44 and an outlet 45 and is positioned with the inlet communicating with the outlet passage 12 and the outlet communicating with the central passage 33 of the by-pass discharge fitting 20. A closure member 46 is installed in the cartridge and is biased by a spring 47 to close the inlet of the cartridge. This closure member opens when pressure is exerted against it by fluid in the passage 12 to allow flow out of the filter housing and into the by-pass discharge fitting central passage 33.

The by-pass conduit 21 fits into the valve fitting by-pass outlet passage 26 and the by-pass discharge fitting by-pass inlet 36 and is held in position by engagement with these fittings. The filter housing tube 13 may be of any convenient length and in this example is shown as having a length sufficient to receive two filter elements 50. The filter housing may also be equipped with a by-pass valve 51 and by-pass indicator 52.

Stop pins 53 and 54 are provided on the valve fitting 22 to engage the valve handle 32 for positioning the valve in its first and second positions and limiting movement of the valve past these positions. These pins limit rotation of the valve handle 32 to a rotation of 90°. The position of the valve handle 32 also indicates whether the valve is in its normal or by-pass position.

The use, operation and function of the invention are as follows:

The filter by-pass assembly of this invention is intended for installation on high speed automatic machine tools used in production line situations. Under such conditions it is highly undesirable to shut down a machine tool to change a clogged filter element. Therefore, it is necessary to provide for continued operation of the machine tool during the changing of the filter elements. The filter elements may be changed at regular intervals or the filter housing may be equipped with pressure drop indicators, as depicted herein, to show when the filter elements should be replaced.

The by-pass assembly and filter housing of the invention is shown in its filtering position in FIGURE 2 wherein the valve 18 is arranged to permit flow through the filter housing 10, through the check valve cartridge 19 and into the central passage 33 of the by-pass discharge fitting. Fluid pressure in the outlet passage 12 forces the check valve cartridge closure member 46 against its spring 47 to compress the spring and allow flow through the cartridge. When the pressure drop across the filter elements 50 reaches a predetermined level, the by-pass valve 51 opens and the indicator 52 signals this condition so that the filter elements may be replaced.

To replace the filter elements without shutting down the machine in which the hydraulic fluid is being circulated, the valve 18 is turned to the by-pass position shown in FIGURE 4. When the valve is moved to the by-pass position, the hydraulic fluid is diverted through the inclined passage 31 of the valve spool 29 to the by-pass outlet 26 of the fitting 22, through the by-pass conduit 21, into the by-pass discharge fitting 20 and into the discharge fitting outlet 35 to return to the machine.

When the valve 18 is rotated to its by-pass position and the hydraulic fluid is diverted through the by-pass conduit 21, the fluid pressure on the closure member 46 of the check valve cartridge 19 is released and the spring moves the closure member to its closed position in which the flow of hydraulic fluid through the cartridge into the filter housing is stopped. After replacement of the clogged filter elements, the valve 18 can be rotated to its filtering position in which the laterally extending passage 30 connects the valve inlet with the filter housing inlet. During normal filter operation, the flow of hydraulic fluid through the filter housing outlet passage 12 exerts pressure against the check valve cartridge closure member and forces this member against its spring to open the passage through the cartridge and allow hydraulic fluid to flow into the central passage 33 of the by-pass discharge fitting 20 and thus to return to the machine.

The design of the by-pass assembly permits easy removal and replacement of the check valve cartridge in the event of its malfunctioning. Removal is accomplished simply by disconnecting the filter element housing from the by-pass fittings and conduits and removing the check valve cartridge. This construction also permits the adaptation of a by-pass arrangement to a standard filter housing since the check valve cartridge fits in a standard filter housing discharge outlet. With this construction in which the check valve cartridge telescopes in the filter housing discharge outlet and the by-passing fitting, a more compact arrangement is obtained. Through the use of the check valve cartridge at the outlet of the filter housing the manipulation of only one valve 18, is required to change the filter from its normal filtering position to its by-pass position. This invention also has the advantage of permitting the use of a spring operated check or undirectional flow valve which is more positive in its operation than the standard check valve and reduces the possibility of leakage during changing of the filter elements.

I claim:
1. A filter and filter by-pass assembly including:
   a filter housing having a chamber adapted to contain at least one filter element,
   an inlet fitting and an outlet fitting connected to said chamber,
   an inlet passage and an outlet passage for said chamber formed, respectively, in said inlet and said outlet fittings,
   a valve fitting adapted to connect to said inlet fitting,
   said valve fitting having an inlet, an outlet and a by-pass outlet with said outlet communicating with said chamber inlet passage,
   a by-pass discharge fitting connected to said chamber outlet fitting,
   said by-pass discharge fitting having an inlet and outlet and a by-pass inlet with said inlet communicating with said chamber housing outlet passage,
   a by-pass conduit connecting said by-pass outlet of said valve fitting and the by-pass inlet of said by-pass discharge fitting,
   a valve located in said valve fitting and operative between a first position in which it connects said valve fitting inlet and said valve fitting outlet and a second position in which it connects said valve fitting inlet and said valve fitting by-pass outlet,
   a check valve cartridge removably insertable in said chamber outlet passage and said by-pass discharge fitting inlet passage to prevent flow into said chamber through said outlet passage, and
   means formed on said chamber outlet fitting and said by-pass outlet fitting to secure said check valve cartridge in position between said fittings.

2. The structure of claim 1 further characterized in that said by-pass conduit is spaced from said chamber with said spacing being less than the length of said check valve cartridge.

3. The structure of claim 1 further characterized in that said check valve cartridge is encapsuled by said chamber outlet fitting and said by-pass discharge fitting and is fixed in position by engagement with said fittings.

4. The structure of claim 1 further characterized in that said check valve cartridge includes a closure member spring urged to a position closing said chamber outlet.

References Cited by the Examiner

UNITED STATES PATENTS

| | | | |
|---|---|---|---|
| 511,798 | 1/1894 | Rankine | 210—130 |
| 1,172,728 | 2/1916 | Perkins | 210—422 X |
| 1,861,805 | 6/1932 | Lentz | 210—130 X |
| 2,070,395 | 2/1937 | Easter | 210—340 X |
| 3,229,816 | 1/1966 | Rosaen | 210—130 |

REUBEN FRIEDMAN, *Primary Examiner.*

F. SPEAR, *Assistant Examiner.*